United States Patent [19]

Okawa

[11] Patent Number: 5,169,909
[45] Date of Patent: Dec. 8, 1992

[54] METHOD FOR THE PREPARATION OF ORGANOPOLYSILOXANE

[75] Inventor: Tadashi Okawa, Chiba, Japan

[73] Assignee: Dow Corning Toray Silicone Co., Ltd., Tokyo, Japan

[21] Appl. No.: 826,344

[22] Filed: Jan. 27, 1992

[30] Foreign Application Priority Data

Jan. 31, 1991 [JP] Japan .................................. 3-31495

[51] Int. Cl.$^5$ .......................................... C08F 283/00
[52] U.S. Cl. ...................................... 525/478; 528/12;
528/33; 528/36; 528/43; 556/469; 556/467
[58] Field of Search ................... 525/478; 528/12, 33, 528/36, 43; 556/469, 467

[56] References Cited

U.S. PATENT DOCUMENTS 2,821,518   1/1958   Edelman ............................ 260/45.4
3,155,634  11/1964   Pike ...................................... 528/12

FOREIGN PATENT DOCUMENTS 114177   4/1991   Japan .

Primary Examiner—Melvyn I. Marquis
Attorney, Agent, or Firm—Alexander Weitz

[57] ABSTRACT

A method for the preparation of an organopolysiloxane which contains in each molecule at least one phenyl group and at least one silicon-bonded hydrogen atom is disclosed, said method comprising reacting (I) an organopolysiloxane having a molecular weight not exceeding 100,000 and containing in each molecule at least one phenyl group and at least one alkoxy group with (II) 1,1,3,3-tetramethyldisiloxane, wherein the reaction is carried out in the presence of an aqueous hydrochloric acid solution, this aqueous solution preferably further comprising an alcohol.

12 Claims, No Drawings

METHOD FOR THE PREPARATION OF ORGANOPOLYSILOXANE

FIELD OF THE INVENTION

The present invention relates to a method for the preparation of an organopolysiloxane which contains at least one phenyl group and at least one silicon-bonded hydrogen atom in each molecule.

BACKGROUND OF THE INVENTION

When an organofunctionalized organopolysiloxane is copolymerized with organic resin monomer or is kneaded (i.e., blended) with an organic resin, the organic resin obtained will have excellent weather resistance, surface water repellency, lubricity, biocompatibility, gas permeability, and so forth. As a result, organofunctionalized organopolysiloxane is employed as an improver or modifier for organic resins.

Various types of organofunctionalized organopolysiloxanes are known for use as organic resin modifiers. Examples of these organofunctionalized organopolysiloxanes are amino modified organopolysiloxanes, epoxy-modified organopolysiloxanes, methacryloxy-modified organopolysiloxanes, carbinol-modified organopolysiloxanes and carboxylic acid-modified organopolysiloxanes. These organofunctionalized organopolysiloxanes are typically prepared by a platinum-catalyzed hydrosilylation reaction between SiH-containing organopolysiloxane and an organofunctional group-containing, aliphatically unsaturated hydrocarbon. Methylpolysiloxane customarily makes up the basic skeleton of the SiH-containing organopolysiloxanes used in this preparative scheme.

Within the context of application as an improver or modifier for organic resins, phenyl containing organopolysiloxanes have a better affinity for organic resins than do methyl-containing organopolysiloxanes. In addition, when an organic resin is kneaded with phenyl-containing organopolysiloxane, the resulting organic resin will have an excellent radiation resistance, heat resistance, noncombustibility, and low-temperature flexibility.

Thus, phenyl-containing organofunctionalized organopolysiloxanes are highly desirable as modifiers or improvers for organic resins for the purpose of improving various properties of these organic resins. The starting material for such phenyl-containing organofunctionalized organopolysiloxanes is a (phenyl+SiH)-containing organopolysiloxane. However, this starting material is extremely difficult to prepare. Cleavage of the silicon-phenyl bond occurs when the (phenyl+SiH)-containing organopolysiloxane is prepared by an equilibration polymerization reaction in the presence of an acid catalyst, while cleavage of the silicon-hydrogen bond occurs when it is prepared by an equilibration polymerization reaction in the presence of a basic catalyst.

The present inventor has already proposed a diphenylsiloxane-dimethylsiloxane copolymer bearing SiH at only one molecular chain terminal or at both molecular chain terminals, as well as methods for the preparation of same: Japanese Patent Application Numbers 02-114177 (114,177/90) and 02-336315 (336,315/90).

The preparative methods proposed in Japanese Patent Application Numbers 02-114177 and 02-336315 characteristically afford a diphenylsiloxane-dimethylsiloxane copolymer bearing SiH at only one molecular chain terminal or at both molecular chain terminals in high yields, which copolymer has a narrow molecular weight distribution. Nevertheless, these methods suffer from certain problems. Thus, expensive, difficult-to-handle organolithium compounds are employed. Moreover it is difficult to control the polymerization reaction over organopolysiloxanes having side-chain SiH cannot be prepared and organopolysiloxane having high SiH contents cannot be prepared.

SUMMARY OF THE INVENTION

The inventor carried out extensive investigations in order to solve the above-listed problems and has developed the present invention as a result. The present invention takes as its object the introduction of a method for the preparation of organopolysiloxane having at least one phenyl group and at least one silicon-bonded hydrogen atom in each molecule.

The object of the present invention can be achieved by reacting (I) an organopolysiloxane having a molecular weight not exceeding 100,000 and containing in each molecule at least one phenyl group and at least one alkoxy group with (II) 1,1,3,3-tetramethyldisiloxane, said reaction taking place in the presence of an aqueous hydrochloric acid solution.

DETAILED DESCRIPTION OF THE INVENTION

The preparative method according to the present invention employs organopolysiloxane which contains in each molecule at least one phenyl group and at least one alkoxy group and which has a molecular weight (MW) not exceeding about 100,000. An organopolysiloxane having a molecular weight greater than 100,000 is only slightly soluble in organic solvents, its Si-bonded alkoxy has a diminished reactivity, and its reaction conversion is extremely low. The alkoxy group in this organopolysiloxane is exemplified by methoxy, ethoxy, propoxy, and hexyloxy, but considerations of economics and reactivity make the methoxy group preferred. The organopolysiloxane under consideration can be prepared by methods well known in the art. Thus, for example, an organopolysiloxane having the following structure can be prepared by the hydrolysis of a mixture of the corresponding dimethoxysilane and trimethoxysilane (refer to Japanese Patent Publication Number 32-7546 [7,546/57]):

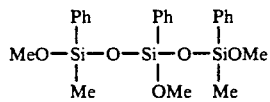

wherein Me and Ph hereinafter denote a methyl radical and a phenyl radical, respectively. In the preparative method disclosed in Japanese Patent Publication Number 32-7546, the molecular weight of the organopolysiloxane product can be regulated by regulating the quantity of water which is reacted with the dimethoxysilane/trimethoxysilane mixture.

In addition to the preceding method, alkoxy-terminated organopolysiloxane can be prepared by running a base-catalyzed copolymerization reaction between octaphenylcyclotetrasiloxane or hexaphenylcyclotrisiloxane or phenylmethylcyclooligosiloxane and another type of diorganocyclooligosiloxane and by using a diphenyldialkoxysilane as the molecular chain end-blocker.

Other than the phenyl and alkoxy groups, no particular restrictions are placed on the silicon-bonded organic groups in the organopolysiloxane employed by the invention's preparative method with the proviso that these groups should not be chemically reactive in the presence of hydrochloric acidic. These organic groups are exemplified by alkyl groups, such as methyl, ethyl, propyl and butyl; by haloalkyl groups, such as 3-chloropropyl, 4-chlorobutyl, 3-fluoropropyl, 3,3-difluoropropyl and 3,3,3-trifluoropropyl; and by cycloalkyl groups, such as cyclopentyl, cyclohexyl and cycloheptyl. The methyl group is preferred based on economic considerations.

In the preparative method according to the present invention, an organopolysiloxane bearing at least one phenyl group and at least one Si-bonded hydrogen in each molecule is prepared by the reaction, in aqueous hydrochloric acid solution of 1,1,3,3-tetramethyldisiloxane with an organopolysiloxane having a molecular weight not exceeding about 100,000 and containing in each molecule at least one phenyl group and at least one alkoxy group. This reaction is exemplified by the following generalized chemical equation:

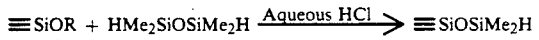

wherein R is an alkyl radical.

The preparative method according to the present invention may be run in a solventless system, but the use of an alcohol solvent is preferred in order to improve the compatibility between the organopolysiloxane and the aqueous hydrochloric acid solution. Examples of suitable alcohols for this purpose include ethyl alcohol, isopropyl alcohol and tert-butyl alcohol isopropyl alcohol being particularly preferred.

No specific restriction is placed on the number of moles of 1,1,3,3-tetramethyldisiloxane to be used in the preparative method according to the present invention. In the case of the preparation of organopolysiloxane which is to contain both alkoxy and SiH in the molecule, the 1,1,3,3-tetramethyldisiloxane should be used at less than the equivalent molar quantity based on the alkoxy in the starting organopolysiloxane. On the other hand, a stoichiometric excess of the 1,1,3,3-tetramethyldisiloxane should be used when all the alkoxy groups in the organopolysiloxane are to be replaced by the dimethylsiloxy group. In this case, the reaction conversion will be better when the 1,1,3,3-tetramethyldisiloxane excesses is increased. However, no more than five times as much, on an equivalent basis, of this reactant should be used based on economic considerations.

The reaction rate in the preparative method according to the present invention is higher at higher aqueous hydrochloric acid solution concentrations. However, excessively elevated concentrations cause cleavage of the silicon-phenyl bond and rearrangement of the siloxane chain. Accordingly, preferred concentrations for the aqueous hydrochloric acid solution fall in the range of one weight% to 36 weight% and preferably in the range of 5 weight% to 15 weight%.

Since the reaction rate increases at higher reaction temperatures in the preparative method according to the present invention, the reaction temperature should be as high as possible. However, excessively high temperatures cause the secondary reactions described above. Accordingly, the reaction temperature should fall within the range of 10° C. to 50° C. and preferably within the range of 20° C. to 40° C. Since the reaction conversion increases with longer reaction times, the reaction time should be as long as possible. Again, however, the above-described secondary reactions occur when the reaction time is too long, and the reaction time should therefore be 30 minutes to 6 hours, preferably in the range of one to 3 hours. The aqueous hydrochloric acid solution concentration, the reaction temperature, and the reaction time do not exercise their effects independently, but rather are interrelated. Thus, when one condition is severe, the other two conditions should be mild in order to obtain the best results.

The progress of the reaction in the preparative method according to the present invention can be followed by periodically withdrawing a sample from the reaction mixture isolating the organic layer, neutralizing the organic layer, washing it with water, drying the organic layer and removing low boilers, and monitoring the appearance of the Si-H bond signal and the decline in the alkoxy group signal by nuclear magnetic resonance. While the organic layer will separate out immediately after termination of the reaction, a water-insoluble solvent which dissolves organopolysiloxane (e. g., toluene or hexane) is advantageously added in order to facilitate separation. The residual hydrogen chloride in the organic layer is then neutralized with a neutralizing agent, such as sodium bicarbonate, and then washed with water until the pH of the aqueous (wash) layer becomes neutral. After drying over a drying agent, such as sodium sulfate or molecular sieves the solvent and low boilers are distilled off by heating in vacuo to afford the organopolysiloxane of the present invention. When toluene is added for separation of the organic layer, drying over a drying agent can be omitted and dehydration and distillation can be conducted simultaneously by azeotropic dehydration.

Not only can the preparative method according to the present invention produce organopolysiloxane having at least one phenyl group and at least one SiH in each molecule, it can also produce organopolysiloxane having a high SiH content. Organofunctionalized organopolysiloxane carrying Si-bonded phenyl can be subsequently prepared by running a platinum-catalyzed hydrosilylation reaction between any of various organofunctionalized aliphatically unsaturated hydrocarbons and the (phenyl+SiH)-containing organopolysiloxane prepared as described above.

EXAMPLES

The following examples are presented to further illustrate the method of this invention, but are not to be construed as limiting the invention, which is delineated in the appended claims. In these examples, Me and Ph denote a methyl and a phenyl radical, respectively.

EXAMPLE 1

Three hundred and twenty mL of isopropyl alcohol, 160 mL of concentrated hydrochloric acid, and 240 mL of water were introduced into a stirrer-equipped four-neck flask, and 51.8 grams (386.8 mmol) of 1,1,3,3-tetramethyldisiloxane was then introduced. A solution of 80 g (77.36 mmol) of organopolysiloxane having the average formula

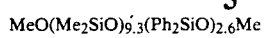

in 80 mL of isopropyl alcohol was subsequently dripped in with stirring at 33° C. to 35° C. for 2 hours. Hexane was added to the reaction mixture and the organic layer was isolated. The residual hydrogen chloride was neutralized by the addition of sodium bicarbonate followed by washing with water until the pH of the aqueous (wash) layer was neutral. The organic layer was dried over sodium sulfate and the solvent and low boilers were then distilled off by heating in vacuo to afford a transparent, colorless polymer. This polymer was confirmed to be an organopolysiloxane having the average formula given below based on nuclear magnetic resonance (NMR), infrared absorption analysis (IR), gel permeation chromatography (GPC), and SiH content as measured by iodometry:

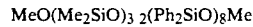

In addition, based on results from $^{29}$Si-NMR analysis, it was confirmed that silicon phenyl group bond cleavage was completely absent.

EXAMPLE 2

One hundred and sixty mL of isopropyl alcohol, 80 mL of concentrated hydrochloric acid, and 160 mL of water were introduced into a stirrer-equipped four-neck flask, and 6.7 g (50.0 mmol) of 1,1,3,3-tetramethyldisiloxane was then introduced. A solution of 40 g (10.0 mmol) organopolysiloxane having the average formula $$MeO(Me_2SiO)_{3.2}(Ph_2SiO)_8Me$$

in 40 mL of isopropyl alcohol was subsequently dripped in with stirring at 26° C. to 35° C. for 2 hours. Work up as in Example 1 afforded a transparent, colorless polymer. This polymer was confirmed to be organopolysiloxane with the average formula given below based on NMR, IR, GPC and SiH content as measured by iodometry:

$$H(Me_2)SiO(Me_2SiO)_{3.2}(Ph_2SiO)_8Si(Me_2)H$$

In addition, based on results from $^{29}$Si-NMR analysis, it was confirmed that silicon-phenyl group bond cleavage was completely absent.

EXAMPLE 3

Six hundred and forty mL of isopropyl alcohol, 160 mL of concentrated hydrochloric acid and 640 mL of water were introduced into a stirrer-equipped four-neck flask, and 259.4 g (1,935.5 mmol) of 1,1,3,3-tetramethyldisiloxane was then added. A solution of 160 g organopolysiloxane (methoxy group content=774.2 milliequivalents) having the average formula

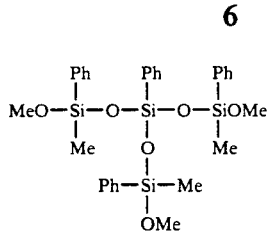

in 160 mL of isopropyl alcohol was subsequently dripped in with stirring at 27° C. for 2 hours. Work up as in Example 1 afforded a transparent, colorless polymer. This polymer was confirmed to be an organopolysiloxane having the average formula given below based on NMR, IR, GPC and SiH content as measured by iodometry:

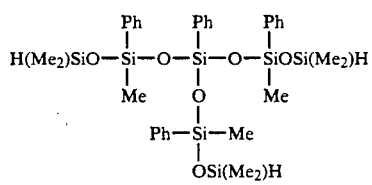

That which is claimed is:

1. A method for the preparation of an organopolysiloxane which contains in each molecule at least one phenyl group and at least one silicon bonded hydrogen atom comprising:
    reacting (I) an organopolysiloxane having a molecular weight not exceeding 100,000 and containing in each molecule at least one phenyl group and at least one alkoxy group with (II) 1,1,3,3-tetramethyldisiloxane,
    said reaction taking place in the presence of an aqueous hydrochloric acid solution.
2. The method according to claim 1, wherein the organic groups on said organopolysiloxane (I) are independently selected from the group consisting of methyl, ethyl, propyl, butyl, 3-chloropropyl, 4-chlorobutyl, 3-fluoropropyl, 3,3-difluoropropyl, 3,3,3-trifluoropropyl, cyclopentyl, cyclohexyl and cycloheptyl radicals.
3. The method according to claim 2, wherein said alkoxy group on said organopolysiloxane (I) is a methoxy radical.
4. The method according to claim 3, wherein the organic group of said organopolysiloxane (I) is a methyl radical.
5. The method according to claim 1, wherein said aqueous hydrochloric acid solution further comprises an alcohol solvent.
6. The method according to claim 5, wherein the organic groups on said organopolysiloxane (I) are independently selected from the group consisting of methyl, ethyl, propyl, butyl, 3-chloropropyl, 4-chlorobutyl, 3-fluoropropyl, 3,3-difluoropropyl, 3,3,3-trifluoropropyl, cyclopentyl, cyclohexyl and cycloheptyl radicals.
7. The method according to claim 6, wherein said alkoxy group on said organopolysiloxane (I) is a methoxy radical.
8. The method according to claim 7, wherein the organic group of said organopolysiloxane (I) is a methyl radical.
9. The method according to claim 5, wherein said alcohol is isopropyl alcohol.
10. The method according to claim 6, wherein said alcohol is isopropyl alcohol.
11. The method according to claim 7, wherein said alcohol is isopropyl alcohol.
12. The method according to claim 8, wherein said alcohol is isopropyl alcohol.

* * * * *